United States Patent
Gaulik et al.

(10) Patent No.: US 12,372,932 B2
(45) Date of Patent: Jul. 29, 2025

(54) METHOD FOR PREDICTING A CHARGING POWER DEMAND FOR ELECTRIC VEHICLES

(71) Applicant: Joynext GmbH, Dresden (DE)

(72) Inventors: Sergius Gaulik, Dresden (DE); Mark Holz, Dresden (DE); Saskia Kuehn, Dresden (DE); Christoph Kuerbis, Dresden (DE); Vadym Pryshchepa, Dresden (DE); Benjamin Schneider, Dresden (DE); Cornelius Steinhardt, Dresden (DE)

(73) Assignee: Joynext GmbH, Dresden (DE)

( * ) Notice: Subject to any disclaimer, the term of this patent is extended or adjusted under 35 U.S.C. 154(b) by 385 days.

(21) Appl. No.: 18/115,802

(22) Filed: Mar. 1, 2023

(65) Prior Publication Data
US 2023/0297051 A1    Sep. 21, 2023

(30) Foreign Application Priority Data
Mar. 18, 2022  (DE) .......................... 102022106339.9

(51) Int. Cl.
G05B 19/042 (2006.01)
B60L 53/00 (2019.01)
G06Q 10/04 (2023.01)

(52) U.S. Cl.
CPC .... G05B 19/042 (2013.01); *G05B 2219/2639* (2013.01)

(58) Field of Classification Search
CPC .......... G05B 19/042; G05B 2219/2639; B60L 53/00; B60L 53/68; B60L 2260/50; B60L 2260/52; B60L 2260/54; G06Q 10/04; G06Q 10/06315; G06Q 50/06
USPC ......................................................... 700/291
See application file for complete search history.

(56) References Cited

U.S. PATENT DOCUMENTS

| | | | |
|---|---|---|---|
| 2021/0318685 A1 | 10/2021 | Jenkins et al. | |
| 2021/0380012 A1* | 12/2021 | Tsuda | G06Q 30/0283 |
| 2023/0009568 A1* | 1/2023 | Kelly | B60L 55/00 |
| 2024/0144398 A1* | 5/2024 | Paik | B60L 53/68 |

FOREIGN PATENT DOCUMENTS

CN    114169774 A    3/2022

OTHER PUBLICATIONS

Examination Report in DE 10 2022 106 339.9 dated Mar. 24, 2024 and English translation thereof.

* cited by examiner

*Primary Examiner* — Michael J Brown
(74) *Attorney, Agent, or Firm* — Manelli Selter PLLC; Edward Stemberger

(57) ABSTRACT

The embodiment relates to a method for predicting a charging power demand for electric vehicles (202). In the method, movement data (204) describing current and/or expected movements of the electric vehicles (202) and energy demand data (205) on planned and/or expected required charges of electric energy for one electric vehicle (202) at a time are recorded in a data cloud (201). The movement data (204) and the energy demand data (205) are used to determine an anticipated spatial and temporal distribution of a charging power demand for supplying the electric vehicles (202) with electrical energy.

9 Claims, 2 Drawing Sheets

METHOD FOR PREDICTING A CHARGING POWER DEMAND FOR ELECTRIC VEHICLES

The invention relates to a method for predicting a charging power demand for electric vehicles.

The term electric vehicle is used here to refer to a vehicle with an electric drive. An electric vehicle usually has an accumulator, i.e. a rechargeable battery, to supply the drive with electrical energy. In the following, recharging an electric vehicle refers to charging its accumulator.

BACKGROUND

Several complications and requirements arise from the need to charge electric vehicles. Firstly, charging an electric vehicle takes more time than, for example, refueling a vehicle with an internal combustion engine. This results in longer idle times and potentially also longer waiting times for electric vehicles at charging stations or charging points that allow the batteries to be recharged. On the other hand, there are still relatively few charging stations or charging points available in some regions. This can make charging an electric vehicle difficult, at least regionally, or require careful planning of the charging process. With regard to the terms charging station and charging point, it should be noted here that a charging point refers to a charging facility for only one electric vehicle at a time, while a charging station can have several charging points, so that several electric vehicles can be charged simultaneously in a charging station with several charging points.

Another potential problem can arise if a local electric power supply network cannot provide sufficient charging power for the charging stations or charging points connected to the power supply network. This problem can occur, for example, if there are many electric vehicles to be charged in an area at the same time. In such a case, there may be a risk of the energy supply network being overloaded by the charging of the electric vehicles.

SUMMARY

The invention is based on the task of providing a method for predicting a charging power demand for electric vehicles.

According to an embodiment, the task is solved by a method for predicting a charging power demand for electric vehicles. The method includes the step of:
  recording in a data cloud, movement data describing current and/or anticipated movements of the electric vehicles, and energy demand data on planned and/or anticipated required charges of electrical energy for one electric vehicle, and determining an anticipated spatial and temporal distribution of a charging power demand for supplying the electric vehicles with electrical energy from the movement data and the energy demand data.

The method according to the embodiment aims at spatially and temporally determining an anticipated charging power demand for supplying electric vehicles with electric energy, i.e. for charging the electric vehicles. Such a determination of the anticipated charging power demand enables a prediction of where an increased charging power demand will occur in the short term. This enables electricity suppliers, grid operators and charging station operators to respond to an expected local increase in charging power demand by adjusting existing generation and transmission capacities of electrical energy.

For example, in an area with an expected critically increased demand for charging power, consumption of electrical energy by other consumers can be temporarily reduced or interrupted. Alternatively or additionally, mobile charging stations or charging points can be provided to cover the increased charging power demand, for example accumulators transported on trucks. Alternatively or additionally, to relieve the load on charging stations or charging points in an area with an expected critically increased charging power demand, route changes can be suggested for electric vehicles for which charging is planned in the area. Furthermore, recommendations for reducing energy consumption, for example by reducing speed, can be issued for such an area.

In addition to initiating short-term measures to meet a locally increased demand for charging power, the method according to the embodiment can be used to plan and advance the expansion of existing generation and transmission capacities of electrical energy and the charging point network in the long term. For example, the generation and transmission capacities of electrical energy and the charging point network can be adapted to the demand that can be derived from a long-term evaluation of the spatial and temporal distribution of the charging power demand.

In order to determine the expected spatial and temporal distribution of the charging power demand of the electric vehicles, the method according to the embodiment provides for recording in a data cloud movement data describing current and/or expected movements of the electric vehicles and energy demand data on planned and/or expected charging requirements of the electric vehicles. Such data can, for example, be transmitted to the data cloud by the electric vehicles themselves and aggregated anonymously in the data cloud.

The expected spatial and temporal distribution of electric vehicle charging demand, for example, is then determined by a data cloud service and made available in the data cloud so that it can be accessed by data users such as electric utilities, routing platform operators, grid operators, and charging station operators.

In one embodiment of the invention, the motion data for an electric vehicle includes a current position of the electric vehicle and a current direction of travel of the electric vehicle.

Such movement data of an electric vehicle enables a determination of a current and expected movement of the electric vehicle. By continuously updating this movement data, the movement of the electric vehicle can be further tracked. By recording and tracking the current positions and directions of travel of a plurality of electric vehicles, a spatial and temporal distribution of the electric vehicles and the temporal evolution of this distribution can be determined.

In another embodiment of the invention, the movement data for an electric vehicle comprises route data of a driving route planned for the electric vehicle. The route data of a travel route includes, for example, a destination or intermediate destination position of the travel route and an estimated time of arrival at the destination or intermediate destination position of the travel route. In particular, the range of the electric vehicle may be less than the remaining travel distance to the destination position of the travel route, and charging of the electric vehicle may occur at the intermediate destination position.

Route data of a planned driving route for the electric vehicle can also be used to derive an expected movement of the electric vehicle. A destination or intermediate destination position of the driving route and an expected arrival time at the destination or intermediate destination position of the driving route also provide indications of a location and a time for an expected charging of the electric vehicle. From the route data for driving routes of a plurality of electric vehicles, an expected spatial and temporal distribution of the electric vehicles and their temporal development can be determined.

In another embodiment of the invention, the energy demand data for an electric vehicle includes the expected range and/or the expected charge capacity of a traction battery of the electric vehicle at the destination or intermediate destination position.

A drive battery of an electric vehicle is understood to be an accumulator that is set up to supply the electric drive of the electric vehicle with electrical energy. The charging capacity of the drive battery of the electric vehicle is understood to be an amount of energy that is required to fully charge the drive battery. The expected range of an electric vehicle is understood to be a distance that can be expected to be traveled by the electric vehicle with the energy currently stored in the traction battery.

The expected range and/or the expected charging capacity of the drive battery of an electric vehicle at the destination or intermediate destination position of a driving route of the electric vehicle indicate whether charging of the electric vehicle at the destination or intermediate destination position is necessary or likely. Furthermore, the expected range and/or the expected charging capacity of the traction battery at the destination or intermediate destination position can be used to estimate an amount of energy that is needed to charge the electric vehicle. Therefore, an estimated spatial and temporal distribution of the charging power demand of these electric vehicles can be estimated from the expected ranges and/or the expected charging capacities of the traction batteries of a plurality of electric vehicles at the destination or intermediate destination positions of the travel routes of the electric vehicles in combination with the expected arrival times of the electric vehicles at the destination or intermediate destination positions. This estimation can be combined, for example, with the movement data and/or energy demand data of other electric vehicles for which no destination or intermediate destination positions are known to determine a predicted spatial and temporal distribution of the charging power demand of all electric vehicles in an area. For this purpose, statistical methods can be used, for example, to extrapolate an anticipated spatial and temporal distribution of the charging power demand determined for a subset of the electric vehicles to all electric vehicles.

In another embodiment of the invention, the provision of energy in an electrical power supply network is controlled as a function of the anticipated spatial and temporal distribution of the charging power demand of the electric vehicles in an area supplied with electrical energy by the power supply network.

The aforementioned embodiment of the invention takes into account the aforementioned problem that an electric power supply network may be overloaded by a locally increased charging power demand of electric vehicles, if a very large number of electric vehicles are to be charged in an area at the same time or within a short period of time. For such a case, the determination according to the invention of an expected spatial and temporal distribution of a charging power demand for supplying electric energy to the electric vehicles provides a means to detect and prevent an imminent potential overload of the energy supply network in time. For example, as also mentioned above, in an area where a critically increased demand for charging power is expected, a consumption of electrical energy by other consumers can be temporarily reduced or interrupted. Such other consumers can be, for example, industrial or public facilities whose power consumption can be temporarily reduced or interrupted.

In another embodiment of the invention, mobile charging stations are used to supply electric energy to electric vehicles at locations where there is insufficient supply of energy and/or charging points.

The aforementioned embodiment of the invention relates to the potential problem of insufficient energy or number of charging points being available to cover the charging power demand, i.e., to perform charging of the electric vehicles to be charged in a reasonable time, at locations where an increased charging power demand of electric vehicles occurs. This problem can also be detected in time by determining a probable spatial and temporal distribution of a charging power demand for supplying electric energy to the electric vehicles according to the invention, so that the problem can be countered by using mobile charging stations for supplying electric energy to the electric vehicles at such locations.

In another embodiment of the invention, a recommendation for a driving route or a change in a driving route of an electric vehicle is determined and provided depending on the expected spatial and temporal distribution of the charging power demand of the electric vehicles.

The aforementioned embodiment of the invention makes it possible, on the one hand, to reduce the charging power demand in an area with an anticipated very high charging power demand by recommending driving routes to electric vehicles that do not lead through this area or lead out of this area. This can reduce the number of electric vehicles to be charged in the area and thus the charging power demand in the area. On the other hand, such recommendations can protect electric vehicles to be charged from long waiting times at charging points in the area.

In another embodiment of the invention, the expansion of an electric power supply network is planned and/or initiated as a function of one or more anticipated spatial and temporal distributions of electric vehicle charging power demand.

The aforementioned embodiment of the invention aims at an expansion of an electric power supply network that is adapted to the charging power demand of electric vehicles or takes this charging power demand into account. According to this embodiment of the invention, for the planning and implementation of such an expansion of an electric power supply network, anticipated spatial and temporal distributions of the charging power demand are used, which are determined with the method according to the invention. In other words, the method according to the embodiment is used to plan and advance the expansion of existing electric power generation and transmission capacities and the charging point network in the long term. For example, the generation and transmission capacities of electrical energy in the energy supply network can be adapted to a charging current demand determined using a long-term evaluation of spatial and temporal distributions of the charging power demand determined according to the invention.

BRIEF DESCRIPTION OF THE DRAWINGS

Embodiments of the invention are explained in more detail below with reference to drawings.

DETAILED DESCRIPRION OF EXAMPLE EMBODIMENTS

Figure 1:
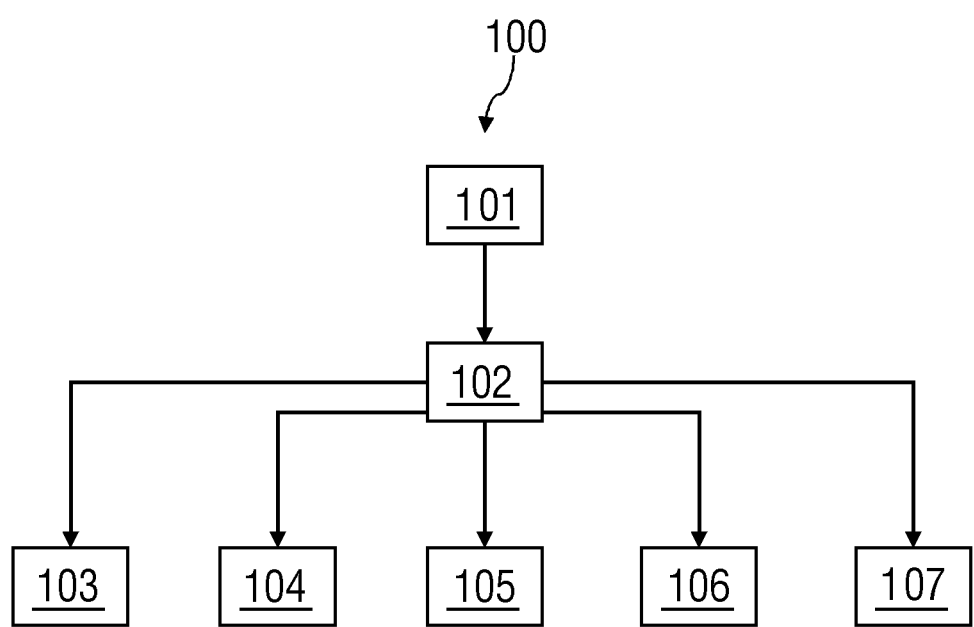
FIG. 1 is a flow chart of an embodiment of the process according to an embodiment of the invention.

FIG. 1 shows a flowchart 100 of an embodiment of the method according to the invention with method steps 101 to 107 for predicting a charging power demand for electric vehicles.

The process steps 101 to 107 are also described below with reference to FIG. 2.

Figure 2:
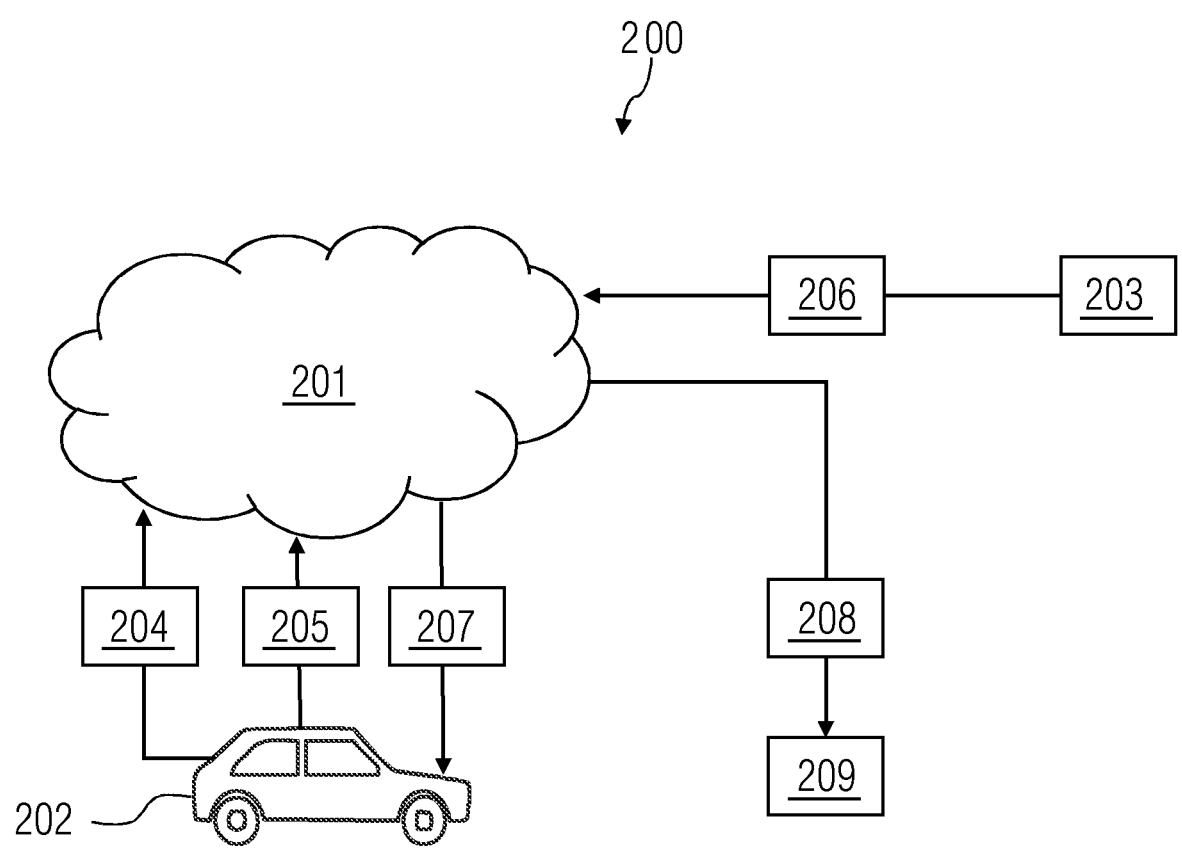
FIG. 2 is a data flow diagram of an embodiment of the method according to an embodiment of the invention.

FIG. 2 shows a data flow diagram 200 of an embodiment of the method according to the invention. Data flows between a data cloud 201 and an electric vehicle 202, a charging point data provider 203 and a data user 209 are shown. In FIG. 2, only an electric vehicle 202, a charging point data provider 203 and a data user 209 that communicate with the data cloud 201 are shown as representatives. In a realistic embodiment of the method according to the invention, a plurality of electric vehicles 202 communicate with the data cloud 201. Cloud services from multiple providers can also be used simultaneously.
Further, multiple charging point data providers 203 and/or data users 209 may communicate with the data cloud 201.

Each of the electric vehicles 202 involved in the process transmits movement data 204 and energy demand data 205, described in more detail below, to the data cloud 201. In each case, the transmission is wireless, for example via a cellular connection or a WLAN connection (WLAN: abbreviation for Wireless Local Area Network).

Each charging point data provider 203 participating in the method transmits charging point data 206 to the data cloud 201. The charging point data 206 describes, for example, charging point locations, charging point operating states, and/or charging point utilization rates.

The data cloud 201 transmits recommendation data 207 to electric vehicles 202. The recommendation data 207 has recommendations for driving routes or changes to driving routes of electric vehicles 202. The recommendation data 207 is also each transmitted wirelessly, for example, via a cellular connection or a WLAN connection, to an electric vehicle 202.

Further, the data cloud 201 provides charging power demand data 208 to the data users 209 participating in the method. The charging power demand data 208 describes an anticipated spatial and temporal distribution of a charging power demand for supplying electric power to the electric vehicles 202. A data user 209 may be, for example, a network control center for controlling and monitoring an electric power supply network, a charging station operator or charging station provider, or a planning agency for an expansion of an electric power supply network or a charging point network.

In a first method step 101, movement data 204 and energy demand data 205 of the electric vehicles 202 are recorded in the data cloud 201. The movement data 204 describes current and/or anticipated movements of the electric vehicles 202. The energy demand data 205 contains information on planned and/or anticipated required charges of electrical energy for one electric vehicle 202 at a time.

The movement data 204 for an electric vehicle 202 includes, for example, a current position of the electric vehicle 202 and a current direction of travel of the electric vehicle 202. The position of the electric vehicle 202 is determined, for example, using a position determination unit arranged in the electric vehicle 202, which receives and evaluates satellite signals from navigation satellites of a navigation satellite system such as GPS, GLONASS, Galileo or/and Beidou. The direction of travel of the electric vehicle 202 is determined, for example, from the change in position of the electric vehicle 202 over time.

Alternatively or additionally, the movement data 204 for an electric vehicle 202 includes route data of a driving route planned for the electric vehicle 202. The route data of a travel route includes, for example, a destination or intermediate destination position of the travel route and an estimated time of arrival at the destination or intermediate destination position of the travel route. An intermediate destination position may be, for example, a location for recharging the electric vehicle 202, particularly if the range of the electric vehicle 202 is less than the remaining travel distance to the destination position of the travel route.

For example, the energy demand data 205 for an electric vehicle 202 includes a current range and/or a current charging capacity of a traction battery of the electric vehicle 202. Alternatively or additionally, the energy demand data 205 for an electric vehicle 202 includes an expected range and/or an expected charging capacity of the traction battery of the electric vehicle 202 at the destination or intermediate destination of the travel route of the electric vehicle 202.

In a second method step 102, a predicted spatial and temporal distribution of a charging power demand for supplying electrical energy to the electric vehicles 202 is determined from the movement data 204 and the energy demand data 205 of the electric vehicles 202.

If for an electric vehicle 202, for example, only the respective current position and direction of travel of the electric vehicle 202 are known as movement data 204 and the respective current range and/or charging capacity of the drive battery of the electric vehicle 202 are known as energy demand data 205, it is estimated from the temporal development of these data when and where the electric vehicle 202 will probably have to be charged. Such an estimate can be made more precise over time by taking into account the temporal developments of the position and direction of travel and the range and/or charging capacity.

If, on the other hand, route data with a destination or intermediate destination position and an expected arrival time at the destination or intermediate destination position are known for an electric vehicle 202, for example, as movement data 204, and the expected charging capacity of the drive battery of the electric vehicle 202 at the destination or intermediate destination position is known as energy demand data 205, it can already be determined relatively precisely on the basis of these data when and where the electric vehicle 202 is expected to be charged. Furthermore, a charging energy likely to be required by the respective electric vehicle 202 during charging can be estimated or determined from the respective ranges and/or charging capacities used.

The aggregate of the expected recharges determined for all electric vehicles 202 is then used to determine the expected spatial and temporal distribution of a charging power demand to supply electric power to the electric vehicles 202.

In a third method step 103, a recommendation for a driving route or a change in a driving route of an electric vehicle 202 is determined and provided depending on the expected spatial and temporal distribution of the charging power demand of the electric vehicles 202.

For example, such a recommendation is issued to an electric vehicle 202 to be charged in a timely manner when the electric vehicle 202 is in an area or moving toward an area that is expected to have a very high charging power demand while driving in the area. The recommendation may then suggest, for example, a driving route or route change that leads out of the area or avoids the area, respectively. This can save the electric vehicle 202 or its occupants a long wait at a charging point in the area. Furthermore, the charging power demand in the area can be reduced if many electric vehicles 202 follow such a recommendation and leave or bypass the area.

In a fourth method step 104, the energy supply in an electrical energy supply network is controlled as a function of the anticipated spatial and temporal distribution of the charging power demand of the electric vehicles 202 in an area supplied with electrical energy by the energy supply network. For this purpose, the anticipated spatial and temporal distribution of the charging power demand of the electric vehicles 202 determined for the area is provided, for example, to a network control station for controlling and monitoring the power supply network. The grid control center is an example of a data user 209 in FIG. 2.

For example, the power supply network is controlled such that it is not overloaded by an increased charging power demand of electric vehicles 202 in the area. If such a charging power demand is to be expected based on the determined expected spatial and temporal distribution of the charging power demand of the electric vehicles 202, for example, a consumption of electrical energy by other consumers in the area is temporarily reduced or interrupted. Alternatively or additionally, for example, the energy provided by the power grid is temporarily increased to meet the charging power demand of the electric vehicles 202.

In a fifth method step 105, mobile charging stations are used to supply electric energy to electric vehicles 202 at locations and times for which the determined probable spatial and temporal distribution of the charging power demand of the electric vehicles 202 predicts an insufficient provision of energy and/or charging points. In this regard, whether a location provides sufficient energy and/or charging points is determined based on, for example, charging point data 206 provided by a charging point data provider 203.

For example, accumulators are used as mobile charging stations for this purpose, which are arranged on trucks and transported by the trucks to the locations with insufficient provision of energy and/or charging points in time to meet the charging power demand at these locations at the times of increased charging power demand.

In a sixth method step 106, the expansion of an electrical power supply network is planned and/or initiated as a function of anticipated spatial and temporal distributions of the charging power demand of the electric vehicles 202 determined in the second method step 102. For this purpose, these spatial and temporal distributions of the charging power demand of the electric vehicles 202 are provided, for example, to a planning center for the expansion of the electric power supply network. The electrical power grid expansion planning center is another example of a data user 209 in FIG. 2.

For example, the expansion of the generation and transmission capacities of electrical energy in the energy supply network is adapted to a charging power demand determined using a long-term evaluation of a plurality of spatial and temporal distributions of the charging power demand determined in each case in the second method step 102.

In a seventh method step 107, the expansion of a charging point network is planned and/or initiated as a function of anticipated spatial and temporal distributions of the charging power demand of the electric vehicles 202 determined in the second method step 102. For this purpose, these spatial and temporal distributions of the charging power demand of the electric vehicles 202 are provided, for example, to a planning body for the expansion of the charging point network or to a charging station operator. The planning agency for the expansion of the charging point network is another example of a data user 209 in FIG. 2.

For example, the expansion of the charging point network is adapted to a charging power demand that is determined using a long-term evaluation of a plurality of spatial and temporal distributions of the charging power demand, each determined in the second method step 102.

LIST OF REFERENCE NUMBERS

100 Flowchart
101 to 107 Process step
200 Data flow diagram
201 Data cloud
202 Electric vehicle
203 Charging point data provider
204 Movement data
205 Energy demand data
206 Charging point data
207 Recommendation data
208 Charging power demand data
209 Data user

The invention claimed is:

1. A method for predicting a charging power demand for electric vehicles (202), comprising the steps of:
   recording in a data cloud, movement data (204) describing power and/or anticipated movements of the electric vehicles (202);
   recording in the data cloud, energy demand data (205) relating to planned and/or anticipated required charges of electrical energy for a respective electric vehicle (202)); and
   determining, in a data cloud service and from the movement data (204) and the energy demand data (205), an anticipated spatial and temporal distribution of a charging power demand for supplying the electric vehicles (202) with electrical energy,
   wherein at locations with insufficient provision of power and/or charging points, the method further includes using mobile charging stations for directly supplying electric power to the electric vehicles (202).

2. The method according to claim 1, wherein the movement data (204) for an electric vehicle (202) comprises a current position of the electric vehicle (202) and a current direction of travel of the electric vehicle (202).

3. The method according to claim 1, wherein the movement data (204) for an electric vehicle (202) comprises route data of a route planned for the electric vehicle (202).

4. The method according to claim 3, wherein the route data of a travel route comprises a destination or intermediate destination position of the travel route and an estimated time of arrival at the destination or intermediate destination position of the travel route.

5. The method according to claim 4, wherein a range of the electric vehicle (202) is less than the remaining travel distance to the destination position of the travel route and charging of the electric vehicle (202) occurring at the intermediate destination position.

6. The method according to claim 4, wherein the energy demand data (205) for an electric vehicle (202) comprises an expected range and/or an expected charging capacity of a traction battery of the electric vehicle (202) at the destination or intermediate destination position.

7. The method according to claim 1, wherein a provision of energy in an electric power supply network is controlled as a function of the expected spatial and temporal distribution of the charging power demand of the electric vehicles (202) in an area supplied with electric power by a power supply network.

8. The method according to claim 1, wherein a recommendation for a driving route or a change of a driving route of an electric vehicle (202) is determined and provided depending on the expected spatial and temporal distribution of the charging power demand of the electric vehicles (202).

9. The method according to claim 1, wherein an expansion of an electric power supply network is planned and/or initiated depending on one or more anticipated spatial and temporal distributions of the charging power demand of the electric vehicles (202).

* * * * *